United States Patent
Mason

(10) Patent No.: US 10,088,633 B2
(45) Date of Patent: Oct. 2, 2018

(54) OPTICAL WAVEGUIDE AND DISPLAY DEVICE

(71) Applicant: BAE SYSTEMS plc, London (GB)

(72) Inventor: Stephen Paul Mason, Rochester (GB)

(73) Assignee: BAE SYSTEMS, plc, London (GB)

( * ) Notice: Subject to any disclaimer, the term of this patent is extended or adjusted under 35 U.S.C. 154(b) by 423 days.

(21) Appl. No.: 14/349,483

(22) PCT Filed: Oct. 4, 2012

(86) PCT No.: PCT/GB2012/052453
§ 371 (c)(1),
(2) Date: Apr. 3, 2014

(87) PCT Pub. No.: WO2013/050762
PCT Pub. Date: Apr. 11, 2013

(65) Prior Publication Data
US 2014/0240834 A1    Aug. 28, 2014

(30) Foreign Application Priority Data

Oct. 4, 2011   (GB) .................................. 1117029.7

(51) Int. Cl.
*G02B 5/18* (2006.01)
*G02B 6/34* (2006.01)
(Continued)

(52) U.S. Cl.
CPC ................ *G02B 6/34* (2013.01); *G02B 5/30* (2013.01); *G02B 27/0081* (2013.01);
(Continued)

(58) Field of Classification Search
CPC .... G03H 1/0244; G03H 1/0011; G03H 1/028; G03H 1/26; G03H 2001/0284;
(Continued)

(56) References Cited

U.S. PATENT DOCUMENTS

2004/0169929 A1* 9/2004 Sato ..................... G02B 5/1819
359/558
2007/0188837 A1* 8/2007 Shimizu ................. G02B 5/203
359/13
(Continued)

FOREIGN PATENT DOCUMENTS

WO       199952002         10/1999
WO    WO 9952002 A1 * 10/1999 ............... G02B 5/32
(Continued)

OTHER PUBLICATIONS

International Preliminary Report on Patentability and Written Opinion received for Patent Application No. PCT/GB2012/052453, dated Apr. 17, 2014, 8 pages.
(Continued)

*Primary Examiner* — Thomas K Pham
*Assistant Examiner* — Sharrief Broome
(74) *Attorney, Agent, or Firm* — Finch & Maloney PLLC

(57) ABSTRACT

An optical waveguide is provided having at least first and second diffraction regions, the first diffraction region being arranged to diffract image-bearing light propagating along the waveguide so as to expand it in a first dimension and to turn the image-bearing light towards the second diffraction region, the second diffraction region being arranged to diffract the image-bearing light so as to expand it in a second dimension and to release it from the waveguide as a visible image. The first diffraction region is formed by first diffraction grating embedded within the waveguide, arranged to present a substantially similar profile to the image-bearing light when incident upon the grating from a given angle above or below the grating such that the polarization of the image bearing light is rotated by substantially similar amounts, but in opposite directions, by successive interactions with the first diffraction region. This enables image- (Continued)

bearing light, emitted from the waveguide, to present an image of substantially uniform intensity.

14 Claims, 5 Drawing Sheets

(51) Int. Cl.
*G02B 27/00* (2006.01)
*G02B 27/42* (2006.01)
*G02B 5/30* (2006.01)
*G02B 27/01* (2006.01)

(52) U.S. Cl.
CPC ..... *G02B 27/0101* (2013.01); *G02B 27/0172* (2013.01); *G02B 27/4205* (2013.01)

(58) Field of Classification Search
CPC .... G03H 2270/24; G03H 1/265; G03H 1/268; G03H 1/28; G03H 2001/0288; G03H 2001/0296; G03H 2001/0478; G03H 2001/0497; G03H 2210/53; G03H 2240/52; B42D 25/328; B42D 25/29; B42D 25/00; B42D 2035/24; B42D 2033/20; B42D 25/324; B42D 2033/18; B42D 25/425; B42D 2033/04; B42D 2033/10; B42D 2033/16; B42D 2035/20; B42D 2035/50; B42D 2033/06; B42D 2033/24; B42D 2033/26; G02B 5/18; G02B 27/0081; G02B 27/0172; G02B 5/1861; G02B 6/00; G02B 27/0101; G02B 2027/0125; G02B 5/1842; G02B 27/4205; G02B 5/32; G02B 2027/0118; G02B 27/0103; G02B 27/1086; G02B 27/4272; G02B 6/0038; G02B 2027/0123; G02B 27/4211; G02B 5/1819; G02B 27/0037; G02B 27/44; G02B 27/42; G02B 2027/011; G02B 2027/0132; G02B 27/04

See application file for complete search history.

(56) References Cited

U.S. PATENT DOCUMENTS

| | | | |
|---|---|---|---|
| 2008/0043334 A1* | 2/2008 | Itzkovitch | ............ G02B 5/1814 359/569 |
| 2011/0176218 A1* | 7/2011 | Noui | ................... G02B 6/0035 359/633 |

FOREIGN PATENT DOCUMENTS

| | | |
|---|---|---|
| WO | 2010119240 A1 | 10/2010 |
| WO | 2010122330 A1 | 10/2010 |
| WO | 2013050762 A1 | 4/2013 |

OTHER PUBLICATIONS

International Search Report received for Patent Application No. PCT/GB2012/052453, dated Feb. 21, 2013, 6 pages.

GB Intellectual Property Office Search Report under Section 17(5) received for GB Patent Application No. 1117029.7 dated Feb. 1, 2012, 4 pages.

* cited by examiner

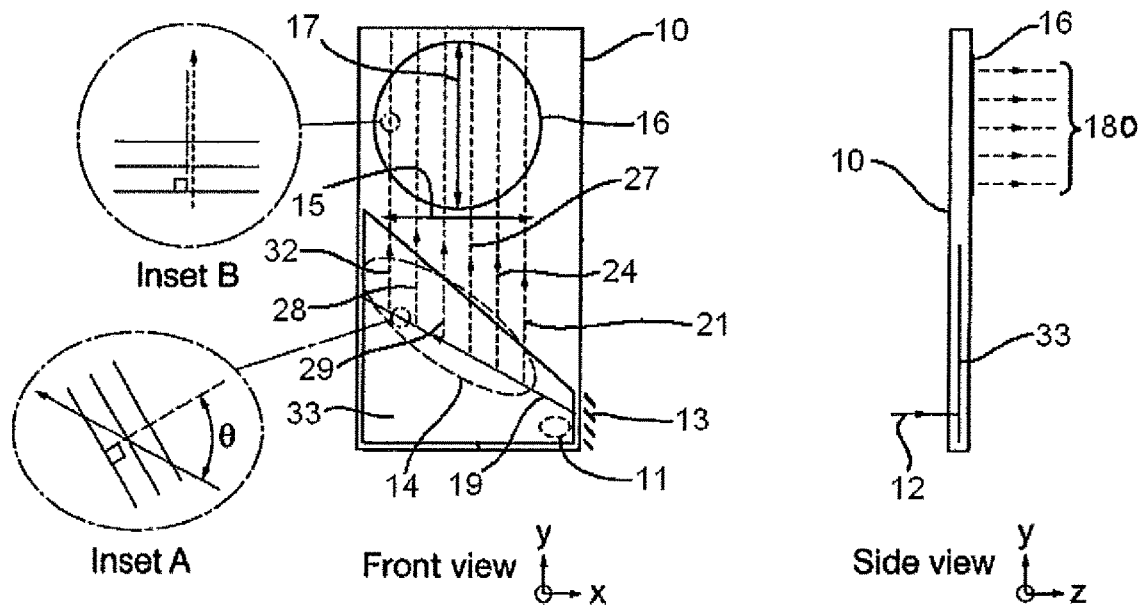
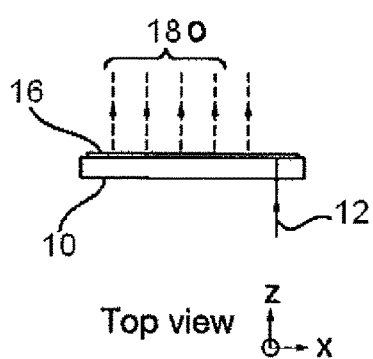
FIG. 1

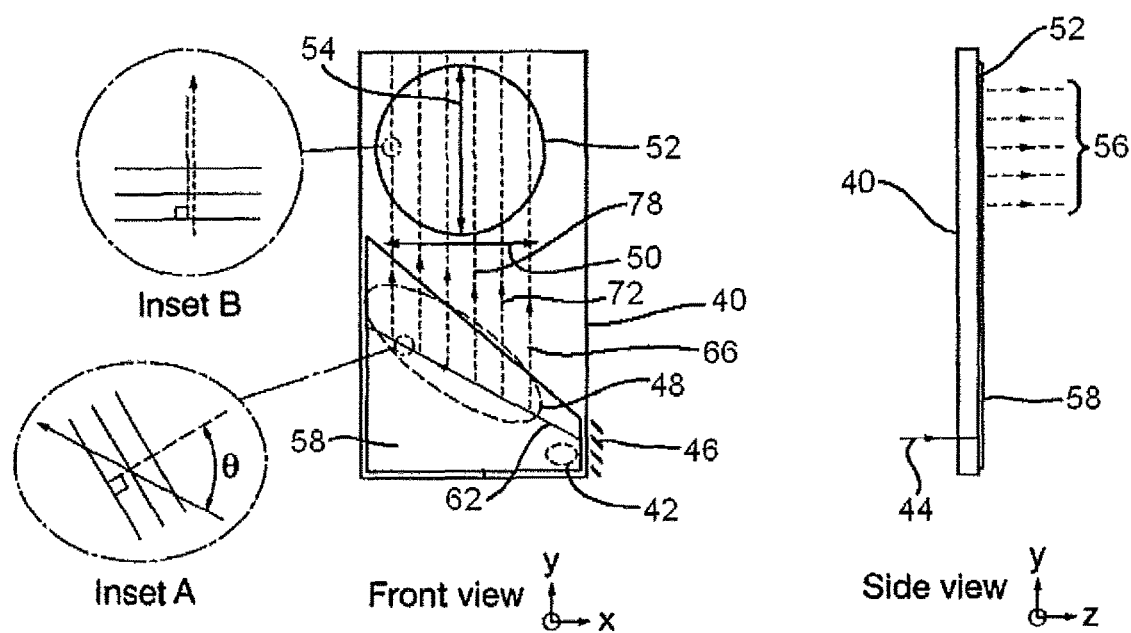
FIG. 4
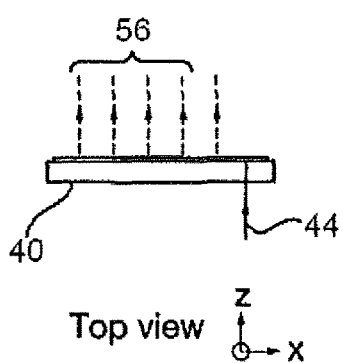

OPTICAL WAVEGUIDE AND DISPLAY DEVICE

This invention relates to an optical waveguide and a display device. In particular it is relevant to display devices in which image bearing light is injected into a waveguide, is expanded in two orthogonal dimensions to form a visible image and is released from the waveguide.

A known form of waveguide for use in a display device has been described in an earlier international patent application by the present Applicant, published as WO 2010/119240, as will now be described with reference to FIG. 4. The waveguide in that case comprises an input diffraction region 42 for coupling an input pupil 44 of image-bearing light into the waveguide for propagation by total internal reflection. The input pupil 44 is directed towards a reflective surface 46 where it is reflected towards a turning diffraction region 48. The turning diffraction region 48 expands the pupil in a first dimension 50 through multiple interactions with the region 48 and turns it towards an output diffraction region 52. The output diffraction region 52 expands the pupil in a second dimension 54 and outputs the image-bearing light from the waveguide with an exit pupil 56. The use of the reflecting surface 46 allows the input diffraction region 42 and the turning diffraction region 48 to be formed by a single grating 58. The reflecting surface 46 may be omitted, although in that case each of the diffraction regions will be formed by separate gratings.

The orientation of the grooves of the grating 58 are inclined at an angle of 60° to the x-axis so that image-bearing light incident on the input region 42 is diffracted and propagated to the reflective surface 46 and thence reflected so that the chief ray propagates and is incident on the grooves of the turning region 48 at 60° to the normal to the grooves (see inset A). The light is partially diffracted and expanded in a first dimension (here the x-dimension) and propagates through the waveguide to the output low diffraction efficiency (2% to 20%) grating 52 having its orientation (grooves) lying in the x-direction. The diffracted rays are incident normally on this grating (see inset B) and are partially diffracted out of the waveguide, the partial diffraction expanding the pupil in a second dimension, here the y-dimension, resulting in the exit pupil 56.

Typical implementations of the waveguide designs described above use a grating 52, 58 carried on the surface of the waveguide, or a grating of a profile such as a blazed grating profile 60 as used for the turning region 48 in the earlier patent application, shown in FIG. 5, to optimise the diffraction efficiency. Analysis has shown that the angled turning diffraction region 48, as required to direct the light towards the output diffraction region 52, will typically rotate the polarisation of both the diffracted light directed towards the output diffraction region 52 and also the light which continues to propagate making multiple further interactions to expand the input pupa in one dimension.

Referring to FIG. 5, a chief input ray 62 is shown directed towards the turning diffraction region 48 from the input diffraction region 42 (not shown in FIG. 5), whether or not via a reflecting surface 46. The input ray 62 has a first angle of polarisation, that is, changes to the state of polarisation of the light may be identified with reference to an angle associated with the state of polarisation of the input ray 62 even though the light is not necessarily plane-polarised. At a first interaction 64 with the turning region 48, a portion 66 of the light is directed towards the output diffraction region 52 (not shown in FIG. 5) and a portion 68 of the light continues to propagate along the turning region 48. At the first interaction 64, the angle of polarisation of both of the portions 66, 68 is rotated in one direction, for example a clockwise direction, and therefore the angles of polarisation of light rays 66, 68 are different from the angle of polarisation of the input ray 62. At a second interaction 70 with the grating 48, a portion 72 of the propagating ray 68 is directed towards the output diffraction region 52 and a portion 74 of the light continues to propagate along the turning region 48. At the second interaction 70, the angle of polarisation of both the portions 72, 74 is rotated further in the same direction, for example a clockwise direction. Consequently, the angle of polarisation of the rays, 72, 74 is typically different so from the angles of polarisations of both the input ray 62 and the propagating ray 68. At a third interaction 76 with the grating 48, a portion 78 of the propagating ray 74 is directed towards the output diffraction region 52 and a portion 80 of the light continues to propagate along the turning region. At the third interaction 76, the angle of polarisation of both the portions 78, 80 are rotated further in the same direction, for example a clockwise direction. Consequently, the angle of polarisation of the rays 78, 80 are typically different from the angles of polarisation of the input ray 62, the propagating ray 68 and the propagating ray 74. Multiple further interactions will occur between propagating rays and the grating 48, although only three interactions are shown. Accordingly, the angles of polarisation of the rays 66, 72 78 directed towards the output diffraction region 52 are typically different from each other. In the example shown in FIG. 4, the output diffraction region 52 is sensitive to the polarisation of light such that a ray having one angle of polarisation will be more optimally diffracted towards a viewer than a ray having another angle of polarisation. The rays 66, 72, 78 constitute expansion of the pupil of image bearing light in the x-dimension and therefore vertical banding may occur in the exit pupil 56 as light is output from the waveguide at different intensities producing lighter and darker regions.

The present invention provides optical waveguide in which, in operation, image-bearing light propagates therein by total internal reflection, the waveguide comprising at least first and second diffraction regions, the first diffraction region being arranged to diffract image-bearing light propagating along the waveguide so as to expand it in a first dimension and to turn the image-bearing light towards the second diffraction region, the second diffraction region being arranged to diffract the image-hearing light so as to expand it in a second dimension and to release it from the waveguide as a visible image, wherein the first diffraction region is formed by first diffraction grating embedded within the waveguide, arranged to present a substantially similar profile to the image-bearing light when incident upon the grating from a given angle above or below the grating such that the polarisation of the image bearing light is rotated by substantially similar amounts, but in opposite directions, by successive interactions with the first diffraction region, thereby increasing the uniformity of intensity of the visible image released from the waveguide.

The image bearing light turned towards the second diffraction region following an even number of interactions with the first diffraction region may have substantially the same polarisation. Additionally or alternatively, the image bearing light turned towards the second diffraction region following an odd number of interactions with the first diffraction region may have substantially the same polarisation.

The grating profile may be symmetrical with respect to a plane extending normally to the waveguide and spaced from a first and from a second principle surfaces of the waveguide by different amounts.

The first diffraction region may have a periodic square wave, sinusoidal or triangular profile.

The invention also provides a helmet-mounted, head-mounted, head-up or other display device comprising such an optical waveguide.

The invention now will be described merely by way of example with reference to the accompanying drawings wherein;

FIG. 1 shows an optical waveguide;

FIG. 4 shows a prior art optical waveguide; and

Figure 2:
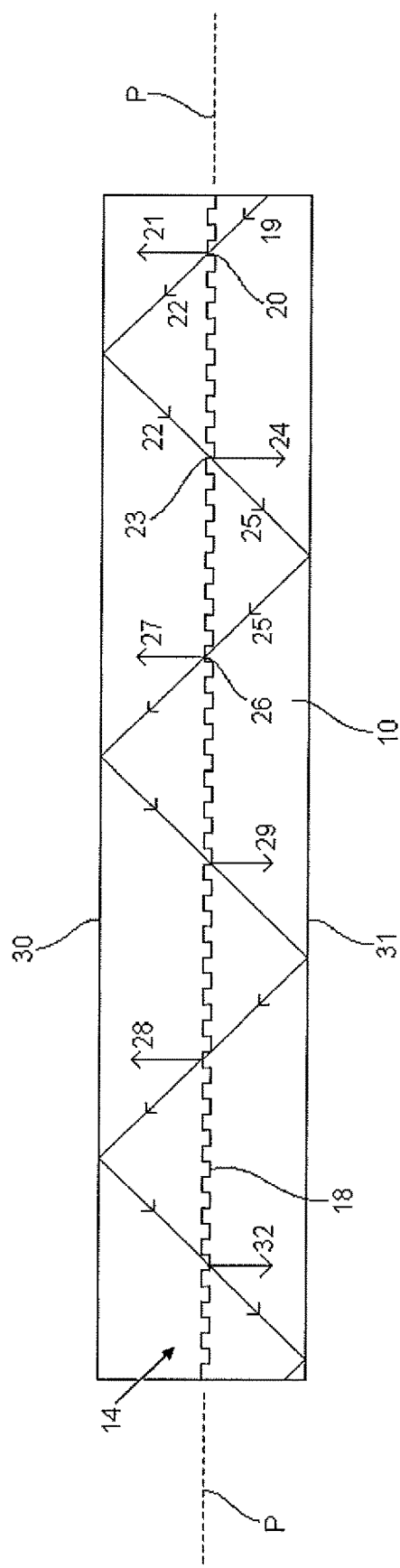
FIG. 2 shows a diffraction region of the optical waveguide.

Referring to FIGS. 1 and 2, an optical waveguide 10 is shown having a number of features in common with the prior art waveguide described above with reference to FIGS. 4 and 5 and shown in WO2010/119240, the contents of which patent publication are hereby incorporated by reference. For brevity, the description of the present embodiment will concentrate predominantly on the inventive differences between the prior art waveguide shown in FIGS. 4 and 5 and that of the present invention, in particular the arrangement of the turning diffraction region (region 48 in FIG. 4).

The waveguide 10 comprises an input diffraction region 11 for coupling an input pupil 12 of image-bearing light into the waveguide 10 for propagation by total internal reflection. The input pupil 12 is directed towards a reflective surface 13, in this example, where it is reflected towards a turning diffraction region 14. The turning diffraction region 14 expands the pupil of image-bearing light in a first dimension 15 through multiple interactions with the region 14 and turns it towards an output diffraction region 16. The output diffraction region 16 expands the pupil of image-bearing light in a second dimension 17 and outputs it from the waveguide as an exit pupil 180. The reflecting surface 13 may be omitted as described above.

In FIG. 2, a section is taken through the waveguide showing a diffraction grating 18 used to implement the turning diffraction region 14 in more detail. The profile of the grating 18 is arranged to present the same profile to light approaching the grating 18 from any given angle either above or below the plane P of the waveguide. The profile of the grating 18 may for example be a square-wave profile as shown in FIG. 2, or a sinusoidal or triangular profile. Such regular, periodic grating profiles share the property of being symmetric about a plane normal to the plane P of the waveguide 10. However, the periodicity of the profile may be varied across the grating 18 while still retaining the property of presenting the same profile to light approaching the grating 18 from a given angle either above or below the plane P of the waveguide.

Figure 5:
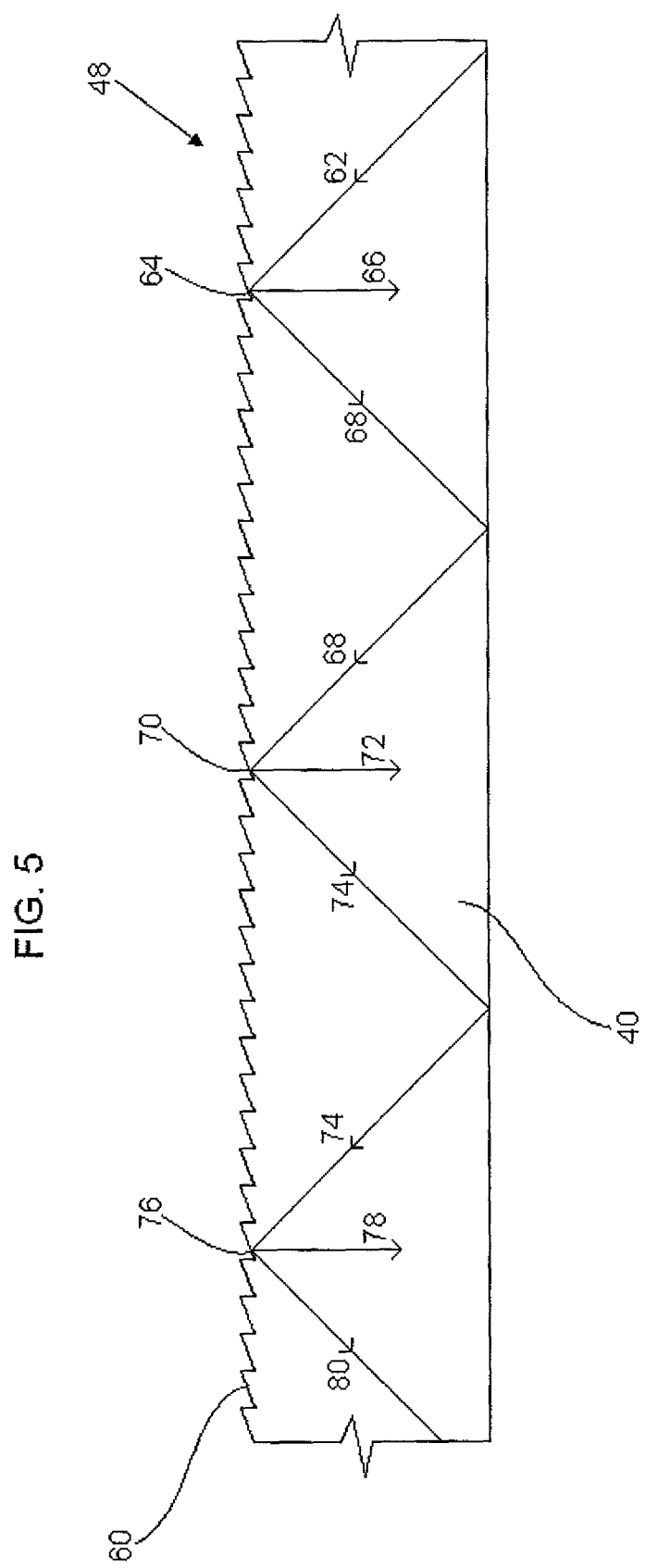
FIG. 5 shows a diffraction region of the prior art waveguide.

The grating 18 is embedded within the waveguide 10, unlike in the prior art waveguide of FIG. 4 and FIG. 5 in which the gratings are formed on a surface of the waveguide. The grating 18 may extend in any plane P of the waveguide 10 although, in the present example it is off-set from a plane which is equally spaced between the principal surfaces 30, 31 of the waveguide 10. The off-set is sufficient to improve pupil banding and uniformity. The embedded arrangement of the grating 18 results a greater number of interactions between the light and the grating 18 than would be possible with a surface-formed grating.

A chief input ray 19 is directed towards the grating 18 of the turning diffraction region 14 from the input diffraction region 11 (not shown in FIG. 2), whether or not via a reflecting surface 13. The input ray 19 has a first angle of polarisation. At a first interaction 20 with the grating 18, a portion 21 of the light is directed towards the output diffraction region 16 (not shown in FIG. 2) and a portion 22 of the light continues to propagate along the grating 18. At the first interaction 20, the angle of polarisation of both the portions 21, 22 is rotated in one direction, for example a clockwise direction, and therefore the angles of polarisation of light rays 21, 22 are different from that of the input ray 19.

At a second interaction 23 with the grating 18, a portion 24 of the propagating ray 22 is directed towards the output diffraction region 16 and a portion 25 of the light continues to propagate along the grating 18. At the second interaction 23, the angle of polarisation of both the portions 24, 25 is rotated in an opposite direction, for example an anti-clockwise direction. Preferably, the second interaction 23 causes the angle of polarisation of the light to be rotated by an equal and opposite amount to the rotation caused by the first interaction 20. Consequently, the angle of polarisation of rays, 24, 25 is typically the same or substantially the same as the angle of polarisation of the input ray 19. Accordingly, the angle of polarisation of the propagating chief ray 25 has therefore returned substantially to the original angle of polarisation of the input ray 19.

It will be seen therefore that successive interactions with the grating 18 cause opposite rotation of the angle of polarisation of both the diffracted rays and the propagating rays, in this way, after an odd number of interactions with the turning grating 18 the angles of polarisation of the diffracted light and the propagating light are rotated compared to the angle of polarisation of the input ray 19 and after an even number of interactions with the turning grating 18 the angles of polarisation of the diffracted light and the propagating light are generally similar or the same as the angle of polarisation of the input ray 19. That is, the rays 21, 27, 28 diffracted towards the output region 16 have a generally uniform first angle of polarisation and the rays 24, 29, 32 diffracted towards the output region 16 have a generally uniform second angle of polarisation. The output diffraction region 16 is sensitive to polarisation and therefore will typically diffract one set of rays (either the odd rays 21, 27, 28 or the even rays 24, 29, 32) more efficiently than the other set of rays. However, unlike the prior art arrangement described above where the angles of polarisation of the diffracted rays 66, 72, 78 are different from one another, in the present invention the angles of polarisation of the even rays are uniform and the angles of polarisation of the odd rays are uniform and therefore the intensity of the image (at least in the X-dimension) output to a viewer will be generally uniform, even though one set of rays is diffracted less efficiently.

It should further be noted that the chief rays of the arrangement have been described in relation to FIGS. 1 and 2. The chief rays 21, 24, 27, 28, 29, 32 are shown in FIG. 1 extending across the X-dimension 15. On first appearance therefore it would seem that the difference in polarisation of the odd and even rays would give rise to banding due to differing diffraction efficiency of the output region 16. However, it must be appreciated that in addition to the chief rays there will be dispersion of light such that rays diffracted from the turning grating will tend to overlap and eliminate any banding.

Referring to FIG. 1, the input diffraction region 11 and the turning diffraction region 14 may be formed by a single grating 33 which is embedded within the waveguide 10. A single grating 33 has advantages from a manufacturing perspective in that the grating 33 can be formed in one manufacturing step, enabling the fringes of the input region 11 to be more accurately aligned with respect to the fringes of the turning region 14. Alternatively, the input region 11 and the turning region 14 may be formed by separate gratings and in this case the reflective surface 13 is not required. For example, this latter arrangement may be preferred if a requirement of the optical system is that the input region is formed by a surface grating. In a still further arrangement the turning region 14 and the output region 16 may be formed by a single embedded grating and in this case a reflective surface is required and is located on an optical path between the turning region 14 and the output region 16 as described in greater detail in the present applicant's earlier application referenced above.

The profile of the grating 18 used to implement the turning region 14 may be formed by conventional means which will be apparent to those skilled in the relevant art, for example by etching or by holography.

A suitable embedded grating can for example be created as described in the present applicant's earlier patent application WO 2010/122330. In one example a suitable profile would be created on the surface of a glass substrate by optical replication from a suitable master profile. The surface would be coated with at least one layer of a dielectric material such as titanium dioxide, silicon dioxide or magnesium oxide. A second glass substrate would then be laminated over the coated surface using a suitable optical adhesive. One example design would use N-BK7 glass and a cement of matching refractive index a square wave grating profile of 435 nm period and 50 nm depth with a titanium dioxide coating of between 25 nm and 50 nm thickness.

Figure 3:
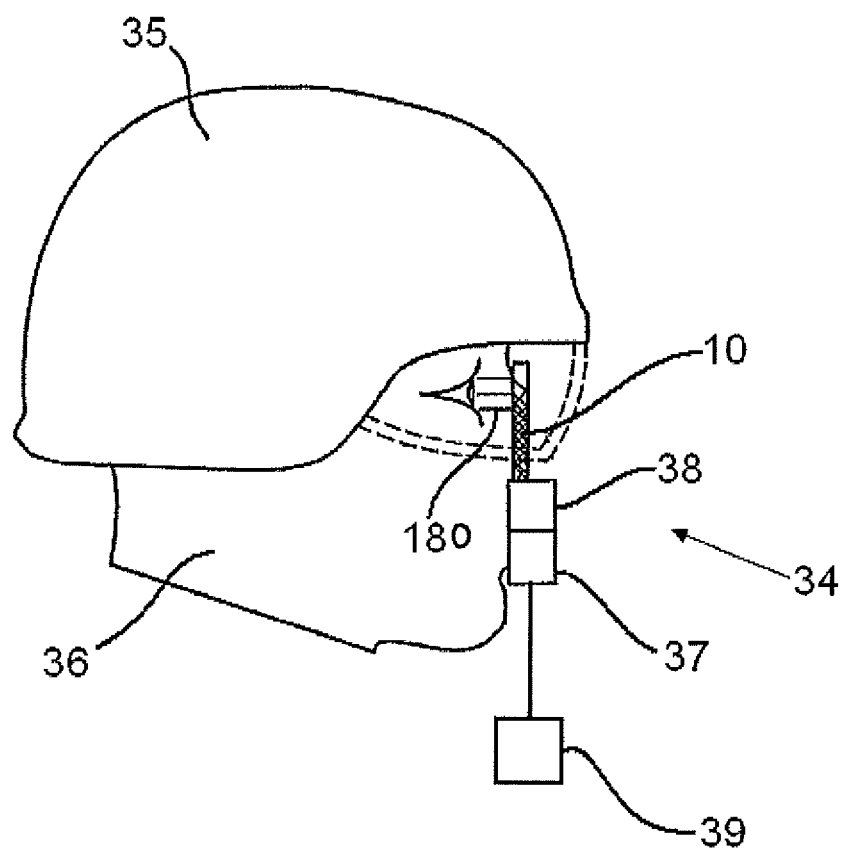
FIG. 3 shows a display device comprising the optical waveguide.

The optical waveguide 10 described with reference to FIGS. 1 and 2 may form part of head-up display, a head or helmet mounted display or other display device. By way of example, a helmet mounted display 34 is shown in FIG. 3 mounted to a helmet 35 worn by a viewer 36. A light source 37 illuminates a micro projector 38 for injecting image bearing light into the waveguide 10 in accordance with image data supplied by an image processor 39. An image is propagated through the waveguide 10 and diffracted out to the user's eye as a visible image 180 with uniform intensity.

The invention claimed is:

1. A display device comprising:
an optical waveguide;
a diffraction grating embedded within the waveguide, the grating configured to cause a first angle of polarization of light interacting with the grating from below the grating to rotate in a first direction and by a first amount, the grating further configured to cause a second angle of polarization of light interacting with the grating from above the grating to rotate in a second direction opposite to the first direction and by a second amount approximately equal to the first amount,
such that the polarization of the light is substantially unchanged after the light has interacted with the grating from below the grating and subsequently from above the grating via total internal reflection within the waveguide.

2. The display device according to claim 1, wherein the diffraction grating is further configured to cause light interacting with the grating to pass through the grating and expand in a first dimension.

3. The display device according to claim 2, further comprising an output diffraction grating configured to diffract and expand light propagating along the waveguide in a second dimension so as to release the light from the waveguide as a visible image.

4. The display device according to claim 1, wherein the diffraction grating is configured such that, after an odd number of interactions with the grating, an angle of polarization of light within the waveguide is rotated compared to an angle of polarization of an input ray, and after an even number of interactions with the grating, the angle of polarization of the light within the waveguide is approximately the same as the angle of polarization of the input ray.

5. The display device according to claim 1, wherein the diffraction grating is spaced from a first principal surface of the waveguide and from a second principal surface of the waveguide by different amounts.

6. The display device according to claim 1, wherein the diffraction grating is configured to present a similar profile to light interacting with the grating from below the grating as to light interacting with the grating from above the grating.

7. The display device according to claim 6, wherein the diffraction grating has one of a periodic square wave profile, a sinusoidal profile, and a triangular profile.

8. The display device according to claim 1, wherein the display device is configured to be mounted to a helmet.

9. The display device according to claim 1, wherein the display device is configured to be worn on a head of a person.

10. The display device according to claim 1, wherein the display device is a head-up display device.

11. The display device according to claim 1, wherein the waveguide further comprises an input diffraction region for coupling an input pupil of image-bearing light into the waveguide.

12. The display device according to claim 11, further comprising a reflective surface configured to reflect the input pupil towards the diffraction grating.

13. The display device according to claim 12, wherein the input diffraction region and the diffraction grating are formed by a single grating.

14. The display device according to claim 6, wherein a cross-section of the profile of the diffraction grating is periodic.

* * * * *